Figure 1:
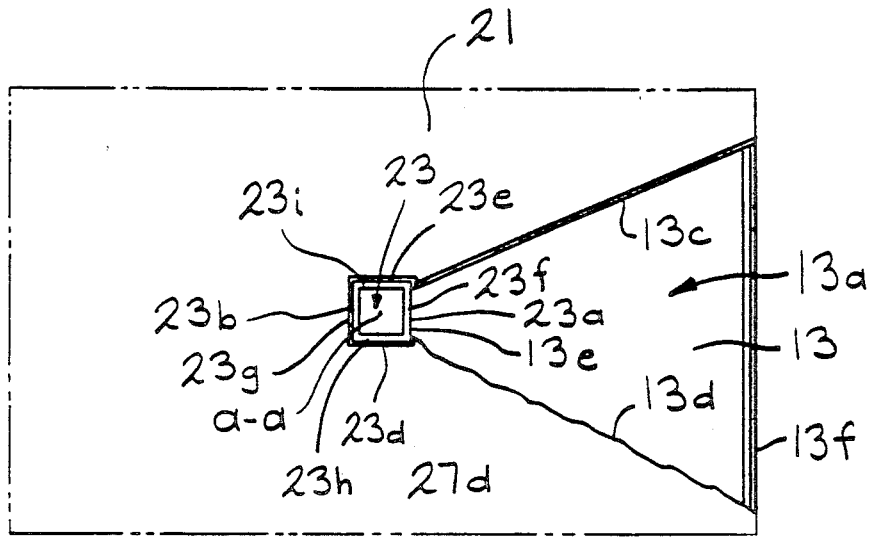

United States Patent [19]

Heiler, Jr.

[11] Patent Number: 5,114,274
[45] Date of Patent: May 19, 1992

[54] SEWAGE TANK SYSTEM AND METHOD OF CONSTRUCTION

[75] Inventor: Leo J. Heiler, Jr., Eagle, Mich.

[73] Assignee: Enviroland, Inc., DeWitt, Mich.

[21] Appl. No.: 672,391

[22] Filed: Mar. 20, 1991

[51] Int. Cl.⁵ .................... E02D 27/00; B09B 3/00
[52] U.S. Cl. ........................ 405/128; 4/506; 52/224; 405/52; 405/55
[58] Field of Search ........... 405/128, 129, 52, 303; 4/506-513; 52/224, 247, 248, 169.4, 169.7; 210/170

[56] References Cited

U.S. PATENT DOCUMENTS

| Re. 29,777 | 9/1978 | Crowley | 52/224 |
|---|---|---|---|
| 2,488,708 | 11/1949 | Clemetsen | 4/506 X |
| 3,157,597 | 11/1964 | Burba | 4/507 X |
| 3,408,784 | 11/1968 | Crowley | 52/224 |
| 3,596,296 | 8/1971 | Gertz | 4/506 X |
| 3,640,038 | 2/1972 | Heron | 52/224 |
| 3,642,138 | 2/1972 | Sheda | 210/170 |
| 3,971,075 | 7/1976 | Heinbaugh et al. | 4/506 X |
| 4,126,976 | 11/1978 | Crowley | 52/224 |
| 4,270,323 | 6/1981 | Crowley | 52/224 |
| 4,473,978 | 10/1984 | Wood | 4/506 X |
| 4,550,538 | 11/1985 | Blakeway | 52/169.7 |
| 4,844,813 | 7/1989 | Helfgott et al. | 405/129 X |
| 4,957,394 | 9/1990 | Jarnagin et al. | 405/128 |

Primary Examiner—Dennis L. Taylor
Attorney, Agent, or Firm—Ian C. McLeod

[57] ABSTRACT

A sewage collection and separation tank (10) and method of construction is described. The sewage tank is built on a prepared earthen site (21) and is comprised of a tank floor (11) constructed from multiple wedge shaped concrete floor sections (13, 15, 17 and 19) that encase a first elastomeric gasket (37) mounted around the perimeter of a centrally located sump pump pit (23). A second elastomeric gasket (41) is mounted in a side (13c) of the first section so that half of the second gasket remains exposed. The tank floor is completed when the fourth section is poured. By the time the fourth section of the tank floor is poured, the first section has cured to the point that the first section will not seal against the wet concrete of the fourth section. However, a side (19e) of the fourth section, adjacent to the first section, encases the exposed half of the second gasket. This provides a liquid impervious seal between the adjacent first and fourth sections. Without the second gasket, the first and fourth sections would not be capable of sealing against each other. The sewage tank is completed by continual interlocking sidewall panels (25) that are mounted around the perimeter of the tank floor and by interlocking roof panels (not shown) mounted on the wall panels and supported by columns (not shown).

42 Claims, 4 Drawing Sheets

SEWAGE TANK SYSTEM AND METHOD OF CONSTRUCTION

BACKGROUND OF THE INVENTION (1) Field of the Invention

The present invention relates to a sewage collection and separation tank system and method of construction Because sewage tanks are usually large in area, the sewage tank floor is preferably built from concrete sections, poured radially around a centrally located sump pump pit. The sections are usually wedge shaped or pie shaped and comprised of a lower face adjacent to an earthen pit or excavation, an upper face parallel to the lower face and first and second sides between the faces. To create a water tight, leak-proof concrete floor for the sewage tank system, it is necessary to ensure that the next section is poured abutting against a wet side of the previous section. When pouring a substantial area of concrete, like a sewage tank floor, it is extremely difficult to get adjoining sides of the first and last sections of the tank floor to seal along their common seam. The first side of the first section will almost always be too dry by the time the second side of the last section is poured to provide a water tight seam between the first and last sections. This can allow fluid held in the tank to leak through the seam and result in pollution which can be economically and environmentally damaging.

As a solution to this problem a first elastomeric gasket is mounted in a groove around the perimeter of the sump pump pit wall. This first gasket is encased in concrete as the sections of the sewage tank floor are poured radially around the sump pump pit and provides an impervious liquid seal between the floor of the sewage tank and the sump pump pit.

A second elastomeric gasket, preferably made of rubber, is mounted in a groove in the first side of the first section of the sewage tank floor so that half of the gasket projects outside of the groove. Regardless whether the concrete at the first side has set-up or dried by the time the last section is poured, the second side of the last section will encase the exposed half of the second gasket, forming a liquid tight seal between the first and last sections. The second gasket thus acts as an impervious member along the seam between the first and last sections and prevents the seepage of liquids held in the sewage tank into the ground below the tank.

Preformed wall panels are mounted in a channel formed around an outer periphery of the tank floor. The wall panels are preferably sealed to the tank floor by a third elastomeric gasket or with a bitumastic compound poured over a non-shrink grout in the channel around the outer periphery of the tank floor. The seal between the wall panels and the tank floor in the channel can also be provided by the third elastomeric gasket in conjunction with a bitumastic compound. The third gasket abuts against the second gasket to provide a seal between the wall panels and the first and last sections of the tank floor. Finally, adjoining wall panels are joined to each other with a joint made of a tongue and a groove provided in the adjoining edges of the wall panels. The tongue and groove joint can be further sealed with a fourth elastomeric gasket, or a sealing compound like tar or an asphalt based compound such as a bitumastic coating over a non-shrink grout or both the elastomeric gasket and the bitumastic coating in conjunction with each other.

(2) Prior Art

The prior art has described various types of concrete holding tanks and concrete pools for holding liquids. However, none of the prior art shows a sewage tank system and method of construction that uses an elastomeric gasket encased between a dry side and a wet side of adjoining poured concrete sections of the sewage tank floor to provide a seal along the seam between the adjoining sections.

The prior art holding tanks and pools are typically built having a unitary concrete floor with side walls made of concrete panels. The concrete panels are mounted side-by-side in a groove formed in the concrete floor. The concrete panels are then sealed to the floor by cast-in-place concrete beams. For added sealing, a water stop sealing material is preferably encased between the concrete floor and the concrete panels and between the side-by-side concrete panels by the cast-in-place concrete. This prior art is illustrated by U.S. Pat. Nos. Re 29,777 to Crowley and 4,126,976 to Crowley.

U.S Pat. Nos. 3,642,138 to Sheda and 4,550,538 to Blakeway are illustrative of liquid holding tanks that use a sealing strip between a metal surface and a concrete foundation or between two metal surfaces to provide a water tight seal. The sealing strip is usually made of an elastomeric material such as a rubber, although tar and oakum also work well.

OBJECTS

It is therefore an object of the present invention to provide a sewage collection and separation tank system comprised of a plurality of concrete tank floor sections poured radially around the perimeter of a centrally located sump pump pit and having an elastomeric gasket extending radially from the sump pump pit between abutting sides of two adjoining sections. The gasket provides a liquid tight seal between the adjoining sections. Further, it is an object of the present invention to provide a method constructing a sewage collection and separation tank system comprised of a plurality of poured concrete tank floor sections fanning radially from a centrally located sump pump pit. The construction method uses an elastomeric gasket that is encased by a first side of a first section and a second side of a last section to provide a liquid impervious seal along the seam between the first and last sections.

Further, it is an object of the present invention to provide a sewage collection and separation tank system wherein an elastomeric gasket is encased along a seam between a dried concrete member and a wet concrete member to provide a liquid impervious seal between the adjoining wet and dry concrete members. Furthermore, it is an object of the present invention to provide a poured concrete sewage collection and separation tank system mounted in a earthen pit that does not allow seepage of liquids held in the tank through seams between adjoining concrete members comprising the tank. These and other objects will become increasingly apparent by reference to the following descriptions and to the drawings.

IN THE DRAWINGS

FIG. 1 is a plan view of the construction of a concrete sewage collection and separation tank 10 showing a sump pump pit 23 mounted in a sump pump pit excavation 27 with a first concrete section 13 of the sewage tank floor 11 extending from the sump pump pit 23.

Figure 2:
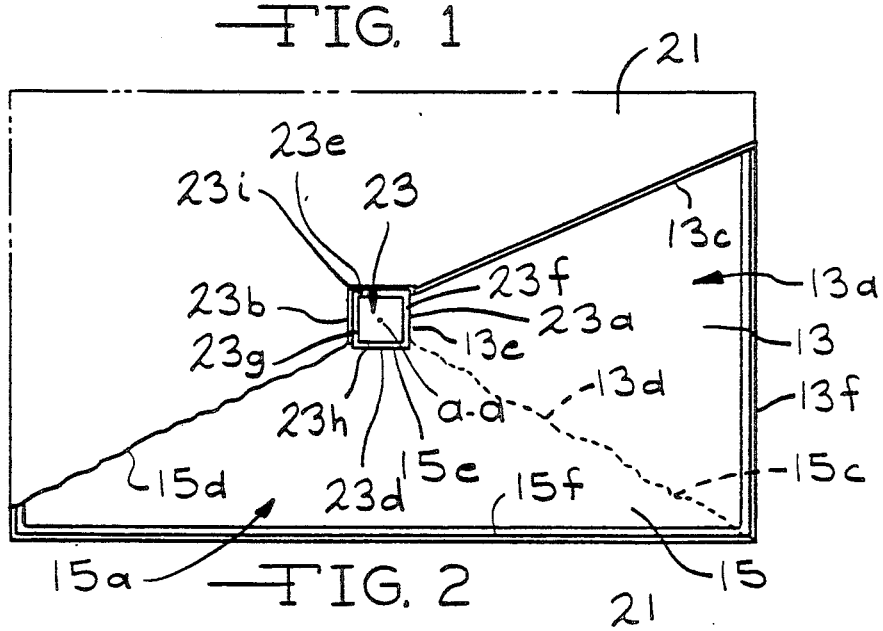

FIG. 2 is a plan view of the construction of the sewage collection and separation tank 10 showing the progression of a second concrete section 15 of the sewage tank floor 11 poured adjacent to the first section 13 and extending radially around the perimeter of the sump pump pit 23.

Figure 3:
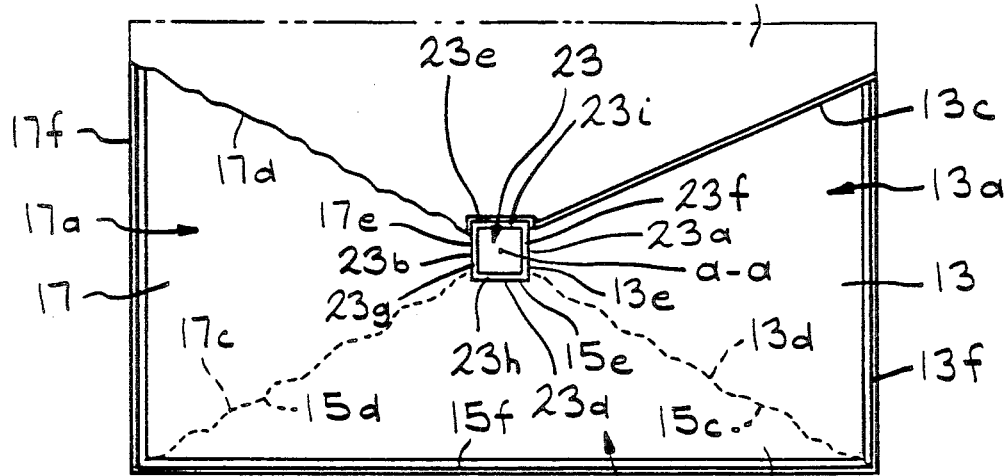

FIG. 3 is a plan view of the construction of the sewage collection and separation tank showing the progression of a third concrete section 17 of the sewage tank floor 11 poured adjacent to the second section 15 and extending radially around the circumference of the sump pump pit 23.

Figure 4:
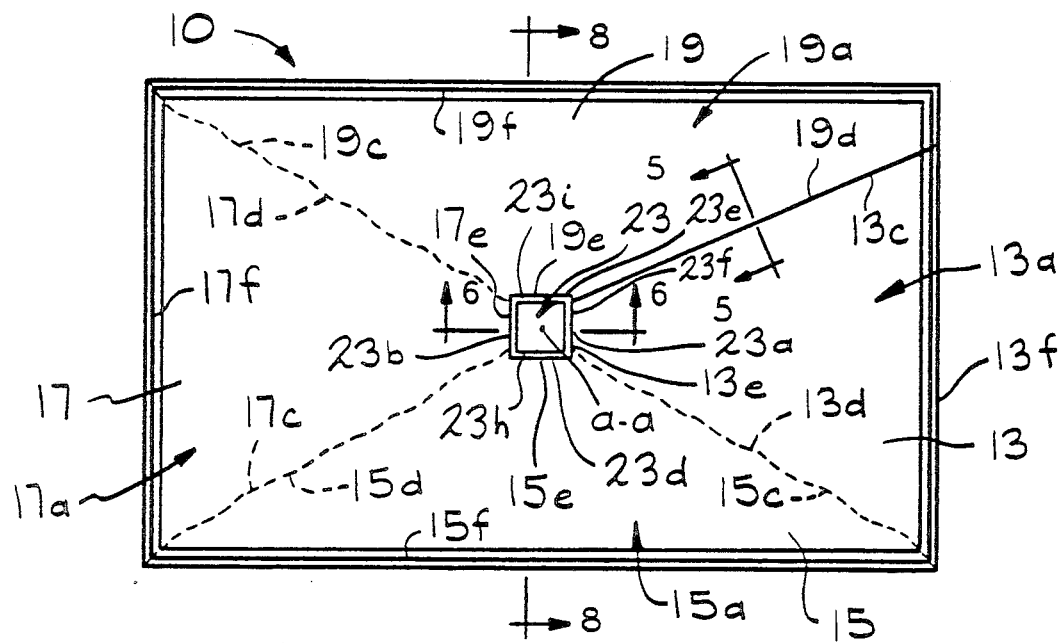

FIG. 4 is a plan view of the construction of the sewage collection and separation tank showing the progression of a fourth section 19 of the sewage tank floor 11 extending from the sump pump pit 23 between the first and third sections 13 and 17 of the sewage tank floor 11.

Figure 5:
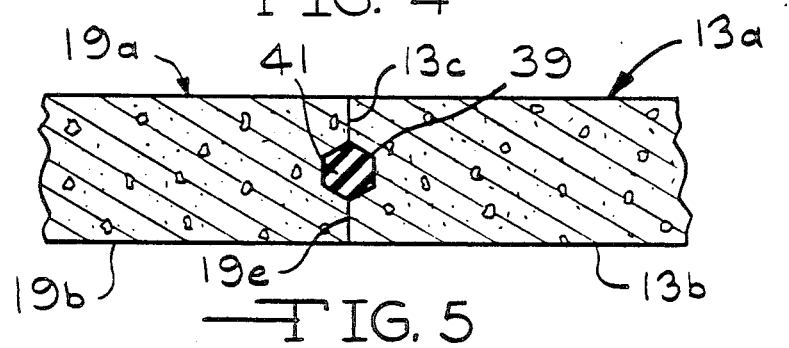

FIG. 5 is a front cross-sectioned view along line 5—5 of FIG. 4 showing a sealing gasket 41 encased between the first section 13 and the fourth section 19 of the sewage tank floor 11.

Figure 6:
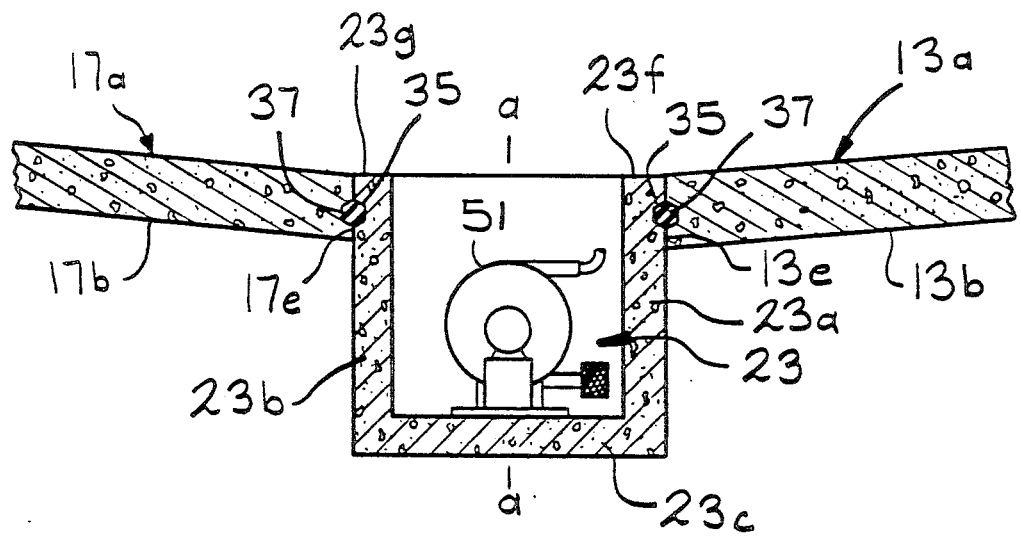

FIG. 6 is a front cross-sectioned view along line 6—6 of FIG. 4 showing a sealing gasket 37 mounted in a groove 35 provided around the perimeter of the sump pump pit 23 and encased by the first 13 and the third 17 sections of the sewage tank floor 11.

Figure 7:
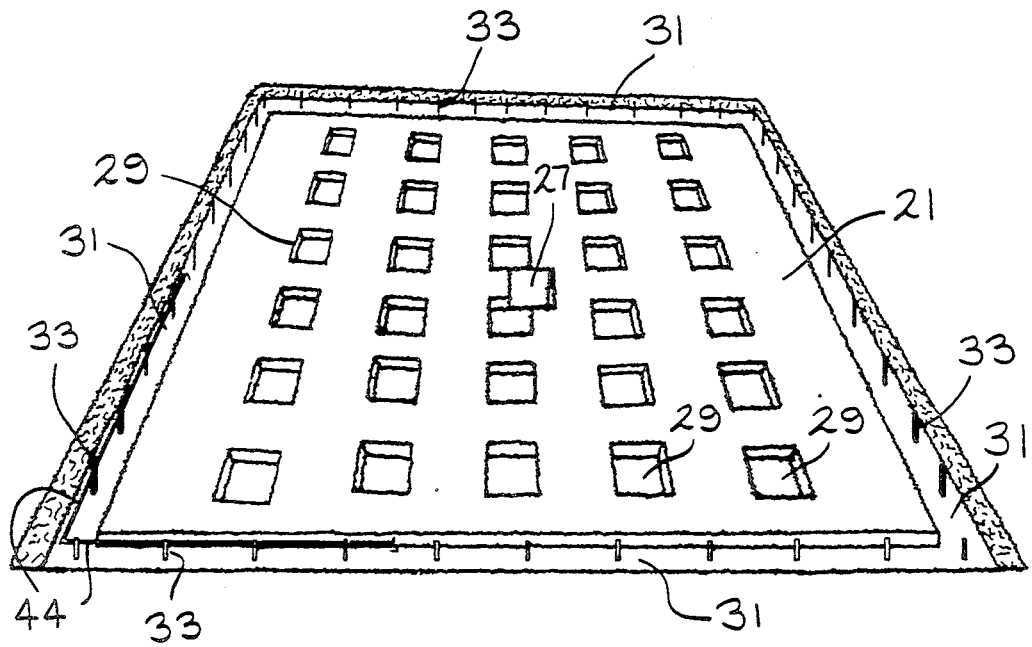

FIG. 7 is a plan perspective view showing the earthen site 21 for the sewage tank 10 with a sump pump excavation pit 27 and a plurality of footings 29 dug in the earthen site 21 and with a shoulder 31 contoured around the perimeter of the earthen site 21.

Figure 8:
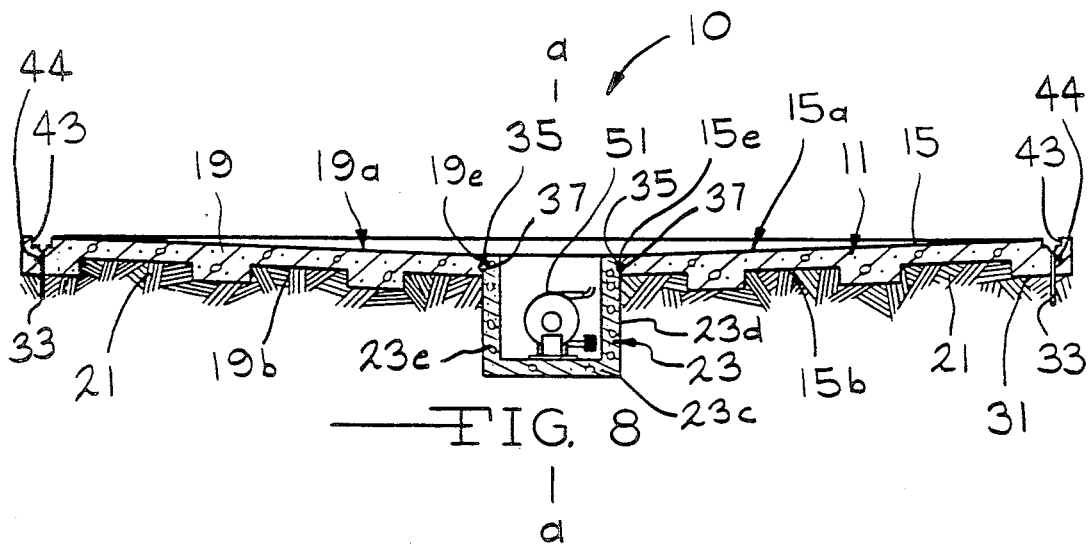

FIG. 8 is a cross-sectioned view along lines 8-8 of FIG. 4 showing the slope of the second and fourth sections 15 and 19 extending from the sump pump pit 23.

Figure 9:
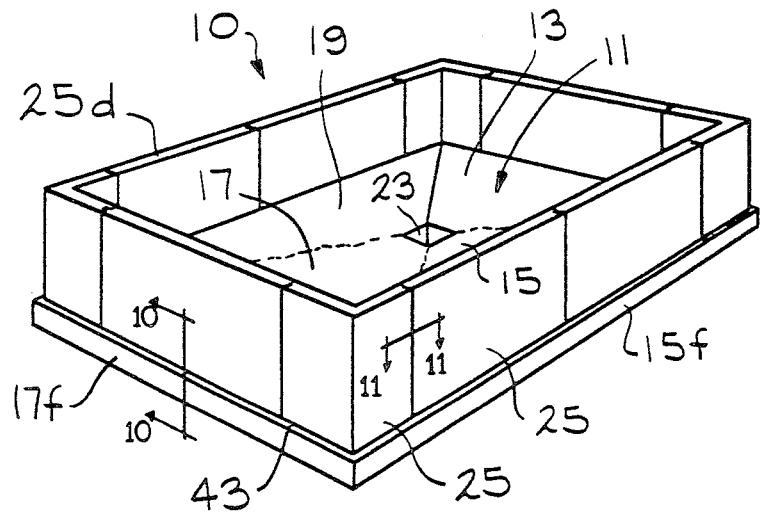

FIG. 9 is a perspective view of the sewage tank 10 with wall panels 25 mounted around the perimeter of the tank floor 11.

Figure 10:
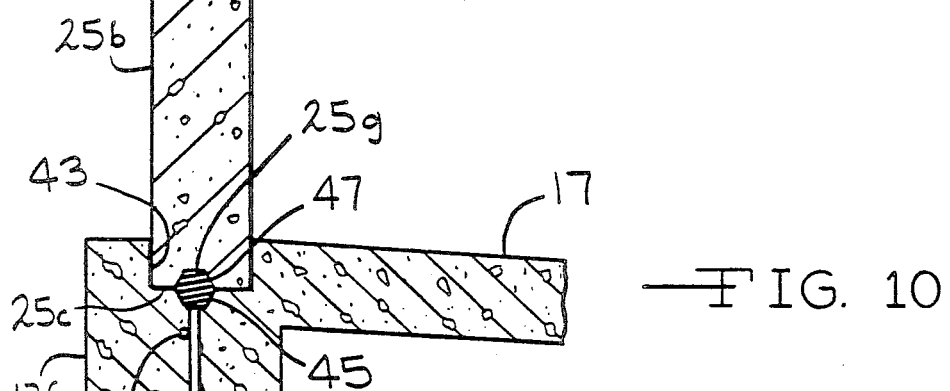

FIG. 10 is a front cross-sectional view along line 10-10 of FIG. 9 showing a channel 43 extending from the third section 17 for mounting wall panel 25 with a third gasket 47.

Figure 11:
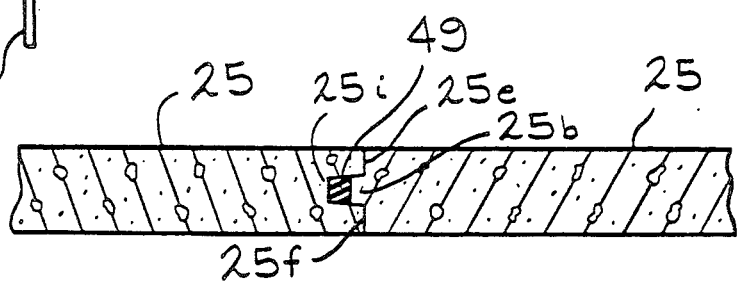

FIG. 11 is a cross-sectional view along line 11-11 of FIG. 9 showing a tongue 25h and a groove 25i in adjoining wall panels 25 with intermediate gasket 48 for sealing and locking the wall panels 25 together.

GENERAL DESCRIPTION

The present invention relates to a sewage collection and separation tank for density separation of sewage which prevents leakage of the sewage from the tank which comprises: a preformed concrete sump box means adapted to be recessed in a floor of an earthen pit and at least one sidewall extending from the bottom wall around a vertical axis, the sump box means having a first gasket means mounted in an outer surface of the sidewall and spaced above the bottom wall of the sump box means; a poured concrete tank floor on the floor of the earthen pit around the outer surface of the sump box means which envelopes the first gasket means of the sump box means, wherein the tank floor has been poured in consecutive sections radially around the vertical axis and the outer surface of the sidewall of the sump box means, each section having a lower face adjacent to the floor of the pit and a spaced apart upper face and spaced apart first and second sides between the faces and spaced apart edges between the sides; a second gasket means extending laterally from the first gasket means mounted in the sidewall of the sump box means, the second gasket means mounted along a first side of a first section of the tank floor so that when a last section of the tank floor is poured, a second side of the last section and the first side of the first section envelope the second gasket means to form a seal between the last section and the first section; and a tank wall extending from the tank floor to define the tank.

Furthermore, the present invention relates to a precast concrete structure for a sewage collection and separation tank for density separation of sewage which prevents leakage of the sewage from the tank and which is adapted to be recessed in a floor of an earthen pit which comprises: a preformed concrete sump box means adapted to be recessed in a floor of an earthen pit with a bottom wall and at least one sidewall extending from the bottom wall around a vertical axis; and a first gasket means mounted in an outer surface of the sidewall of the sump box means and spaced above the bottom wall of the sump box means.

The precast invention relates to a method for constructing a sewage collection and separation tank for density separation of sewage which prevents leakage of sewage from the tank which comprises: providing a preformed concrete sump box means adapted to be recessed in a floor of an earthen pit and with a bottom wall and at least one sidewall extending from the bottom wall around a vertical axis, the sump box means having a first gasket means mounted in an outer surface of the sidewall and spaced above the bottom wall of the sump box means; mounting the sump box means in the earthen pit; pouring a concrete tank floor on the floor of the earthen pit around the outer surface of the sump box means which envelopes the first gasket means of the sump box means, wherein the tank floor is poured in consecutive sections radially around the vertical axis and the outer surface of the sidewall of the sump box means, each section having a lower face adjacent to the floor of the pit and a spaced apart upper face and spaced apart first and second sides between the faces and spaced apart edges between the sides and wherein a second gasket means that extends laterally from the first gasket means is mounted in the sidewall of the sump box means along a first side of a first section of the tank floor so that when a last section of the tank floor is poured, a second side of the last section and the first side of the first section envelope the second gasket means to form a seal between the last section and the first section; mounting preformed tank walls around the concrete floor to produce the tank.

The grooves which provide for mounting the elastomeric gaskets are multi-sided and preferably semi-hexagonal. A multi-sided groove provides a tortuous path that a liquid will have to travel to leak between the gasket and the groove. The more tortuous the path, the greater the likelihood that a liquid impervious seal will be formed between the gasket and the groove. It is also important that the gasket seal properly in the multi-sided groove to provide the liquid impervious seal.

SPECIFIC DESCRIPTION

The preferred embodiment of a sewage collection and separation tank 10 of the present invention and method for constructing the sewage tank 10 is shown in FIGS. 1 to 11. The sewage tank 10 (FIG. 9) is comprised of a concrete sewage tank floor 11 formed from four poured concrete sections 13, 15, 17 and 19 poured on a graded earthen site 21 around a sump pump pit 23

(FIG. 8). Sidewalls consisting of interlocking wall panels 25 extend from an outer periphery of the tank floor 11.

Referring specifically to FIGS. 7 and 8, the earthen site 21 where the sewage tank 10 is to be constructed is first surveyed, staked and then graded. A sump pump pit excavation 27 for the sump pump pit 23 is then dug. The excavation 27 has a square cross-section along the vertical axis and is dug slightly larger than the sump pump pit 23 which will be mounted in the sump pump pit excavation 27.

Before the sewage tank floor 11 is poured, rectangular footing holes or depressions 29 are dug in the earthen site 21 and an earthen shoulder 31 is contoured around the perimeter of the earthen site 21. The footing holes 29 have a square shape along a vertical axis. Although five rows of six footing holes 29 are preferred, any number of rows of footing holes or any pattern of footing holes 29 can be used depending on the areal extent of the sewage tank floor 11. The primary function of the footing holes 29 and the shoulder 31 is to provide stability for the sewage tank floor 11. A plurality of metal reinforcing rods 33 are driven vertically into the shoulder 31. The rods 33 support a removeable molding or form member (not shown) that provides a main channel 43 for mounting the wall panels 25 (FIGS. 8 and 10).

Once the earthen site 21 has been prepared, the sump pump pit 23 is mounted in the sump pump pit excavation 27. As shown in FIGS. 6 and 8, the sump pump pit 23 is a unitary concrete box having spaced apart sidewalls 23a and 23b extending from a bottom wall 23c with end walls 23d and 23e between the sidewalls 23a and 23b. The sump pump pit 23 has a square cross-section when viewed along the vertical axis a—a.

A semi-hexagonal groove 35 is preformed or cut in the outside of the sidewalls 23a and 23b, and in the outside of the end walls 23d and 23e of the sump pump pit 23, spaced from the upper ends 23f and 23g of the sidewalls 23a and 23b and the upper ends 23h and 23i of the end walls 23d and 23e. The distance of the semi-hexagonal groove 35 from the upper ends 23f and 23g of the sidewalls 23a and 23b and from the upper ends 23h and 23i of the end walls 23d and 23e is preferably one-half the thickness of the sewage tank floor 11. A first hexagonal elastomeric gasket 37, preferably made of rubber, is then mounted in the groove 35. The first gasket 37 has a length sufficient to extend the length of the perimeter of the sump pump pit 23 and can be overlapped or solvent welded together between abutting ends.

After the sump pump pit 23 has been mounted in the excavation 27, the sewage tank floor 11 of the sewage tank 10 is constructed. As shown in sequence in FIGS. 1 to 4, a first section 13, having a cuneiform or wedge shape (FIG. 1), is poured extending from the sidewall 23a of the sump pump pit 23 to the shoulder 31 of the earthen site 21. The first section 13 is comprised of an upper face 13a that extends from the upper end 23f of the sidewall 23a of the sump pump pit 23 and a lower face 13b poured against the earthen site 21, essentially parallel to the upper surface 13a (FIG. 6), with spaced apart sides 13c and 13d between the faces 13a and 13b, and edges 13e and 13f between the sides 13c and 13d. The first section 13 has a thickness that is sufficient to encase the first gasket 37 at an intermediate position between the upper face 13a and the bottom face 13b of the first section 13. This provides a liquid tight seal between the side 23a of the sump pump pit 23 and the front edge 13e of the first section 23.

As shown in FIG. 5, a semi-hexagonal groove 39 is provided in side 13c by a molding or form member (not shown). The groove 39 extends the entire length of the side 13c from the first gasket 37 mounted in the side 23a of the sump pump pit 23 to the back edge 13f of the first section 13 adjacent to the shoulder 31 of the earthen site 21. Prior to pouring the final section 19, a second elastomeric hexagonal gasket 41 is then mounted in the groove 39 with one end (not shown) abutting against the first gasket 37 mounted in the side 23a of the sump pump pit 23. This provides a liquid tight seal between the sump pump pit 23 and the front edge 13e of the first section 13. The second gasket 41 extends the entire length of the groove 39 along the side 13c of the first section 13.

After the upper face 13a of the first section 13 has been screed to a smooth surface and while the side 13d is still wet, the second section 15 is poured as shown in FIG. 2. The second section 15 of the sewage tank floor 11 is similar to the first section 13 and extends from the end wall 23d of the sump pump pit 23 to the shoulder 31 of the earthen site 21. The second section 15 is comprised of an upper face 15a and a parallel lower face 15b with spaced apart sides 15c and 15d between the faces 15a and 15b and edges 15e and 15f between the sides 15c and 15d. Side 15c abuts against the side 13d of the first section 13. Since the two sides 13d and 15c are comprised of wet cement, a large unitary area consisting of sections 13 and 15 is formed that is impervious to liquids. In a similar manner as edge 13e of section 13 encased the first gasket 37 mounted on the side 23a of the sump pump pit 23, the front edge 15e of the second section 15 encases that part of the first gasket 37 mounted along the end 23d of the sump pump pit 23. This forms a liquid impervious seal between the second section 15 and the end 23d of the sump pump pit 23.

After the upper face 15a of the second section 15 of the sewage tank floor 11 has been screed to a smooth surface, and while the concrete at the side 15d is still wet, concrete for the third section 17 is poured as shown in FIG. 3. The third section 17 of the sewage tank floor 11 extends from the side 23b of the sump pump pit 23 to the shoulder 31 of the earthen site 21. The third section 17 is comprised of an upper face 17a and a parallel lower face 17b with spaced apart sides 17c and 17d between the faces 17a and 17b, and edges 17e and 17f between the sides 17c and 17d. Side 17c abuts against the side 15d of the second section 15. Since the two sides 17c and 15d are comprised of wet cement, the sewage tank floor 11 is extended so that sections 13, 15 and 17 form a unitary area that is impervious to liquid seepage into the earthen site 21 below. The front edge 17e of the third section 17 encases that part of the first gasket 37 mounted along the side 23b of the sump pump pit 23. This forms a liquid impervious seal between the third section 17 and the sump pump pit 23.

Once the upper face 17a of the third section 17 has been screed to a smooth surface, the sewage tank floor 11 is ready to be completed. The fourth and final section 19 extends from the end 23e of the sump pump pit 23 to the shoulder 31 of the earthen site 21 and is shown in FIG. 4. The fourth section 19 is comprised of an upper face 19a and a parallel lower face 19b with spaced apart sides 19c and 19d between the faces 19a and 19b, and edges 19e and 19f between the sides 19c and 19d. Side 19c abuts against the side 17d of the third section 17 while the side 19d abuts against the side 13c of the first section 13. The front edge 19e of the fourth section 19 encases that part of the first gasket 37 mounted along the end 23e of the sump pump pit 23. Since the side 17d of the third section 17 and the side 19c of the fourth section 19 are comprised of wet cement, the third and fourth sections 17 and 19 form a unitary area extending around the perimeter of the sump pump pit 23. However, by the time that the fourth section 19 is poured, the side 13c of the first section 13 has dried. It is extremely difficult to bond wet cement to dry cement to create a liquid impervious seal between the two cements.

Before the fourth section 19 is poured, half of the second gasket 41, mounted in the groove 39 along the side 13c of the first section 13, is exposed. When the fourth section 19 is poured, the side 19d of the fourth section 19 encases the second gasket 41 and forms a liquid impervious seal along the seam between the first and fourth sections 13 and 19. Thus, the first gasket 37 seals along all the seams between the four sections 13, 15, 17 and 19 and the sump pump pit 23 while the second gasket 41 seals along the seam between the first section 13 and the fourth section 19. The two gaskets 37 and 41 act as sealing members for the sewage tank 10 whenever there is a wet concrete member being poured abutting against a dry concrete member.

The sewage collection and separation tank 10 is completed by wall panels 25. As the sections 13, 15, 17 and 19 of the tank floor 11 are poured, the earthen shoulder 31 is encased in concrete while the rods 33 support a removeable form (not shown) that serves to shape the main channel 43 around the perimeter of the tank floor 11 for mounting the wall panels 25 (FIGS. 8 and 10). As shown in cross-section in FIGS. 8 and 10, reinforcing rods 44 are laid horizontally, adjacent to the rods 33. The reinforcing rods 44 are fastened to the rods 33 by fasteners (not shown) or welding and add support to the rods 33 supporting the removeable form or mold for the main channel 43. A semi-hexagonal groove 45 is provided inside the main channel 43 by the molding or form member (not shown) and serves for mounting a third hexagonal gasket 47. The third hexagonal gasket 47 is preferably made of rubber and is mounted in the groove 45 with half of the gasket 47 remaining exposed.

The third gasket 47 abuts against the second gasket 41 mounted between sections 13 and 19 of the tank floor 11 and provides a liquid impervious seal between the wall panels 25 and the tank floor 11. The wall panels 25 are preformed concrete with spaced apart front and back sides 25a and 25b with ends 25c and 25d between the sides 25a and 25b and edges 25e and 25f between the ends 25c and 25d. The bottom end 25c of each wall panel 25 is provided with a semi-hexagonal groove 25g (FIG. 10) while the edge 25e has a tongue 25h and edge 25f has a groove 25i (FIG. 11).

As shown in FIG. 10, the wall panels 25 are mounted in the channel 43, standing on end 25c. The groove 25g in the panels 25 encases the third gasket 47 to form a liquid impervious seal between the panels 25 and the tank floor 11. The wall panels 25 can also be sealed in the channel 43 with a bitumastic coating over a non-shrink grout (not shown) or the wall panels 25 can be sealed in the channel 43 with the third gasket 47 in conjunction with the bitumastic coating.

The panels 25 are joined to each other with the tongue 25h of one panel 25 mating with the groove 25i of another panel 25 to form a joint between side-by-side panels 25. A fourth elastomeric gasket 49, preferably made of rubber, is mounted between the tongue 25h and the groove 25i of adjoining wall panels 25 to form a liquid impervious seal between the side-by-side panels 25 as shown in FIG. 11. The fourth gasket 49 extends to the third gasket 47 and together the third and fourth gaskets 47 and 49 form a liquid impervious seal between the wall panels 25 and the tank floor 11. A sufficient number of wall panels 25 are assembled around the perimeter of the tank floor 11 to completely surround the tank floor 11. Adjoining wall panels 25 can also be sealed to each other by a bitumastic coating over a non-shrink grout (not shown) or the fourth gasket 49 can be used in conjunction with the bitumastic coating. The wall panels 25 can be further supported by backfill (not shown) from earth excavated to build the earthen site 21.

A pump 51 is inserted in the sump pump pit 23 when the tank 10 is emptied. The pump 51 allow solids that precipitate from sewage held in the sewage tank 10 to be drawn off and pumped out of the sewage tank 10 so that the remaining liquids in the sewage tank 10 can be chemically treated for reintroduction back into the environment. The sewage collection and separation tank 10 is preferably completed by a roof (not shown) formed of a plurality of precast, interlocking roof panels (not shown). The roof panels are preferably supported by columns (not shown) extending from the tank floor 11 to the roof panels.

As can be seen in FIG. 8, the opposed sections 15 and 19 of the sewage tank floor 11 have a slope of between about 3° and 6.5° degrees with respect to the horizontal form the shoulder 31 to the vertical axis a—a. The sections 13 and 17 have a similar slope. The slope of the sections 13, 15, 17 and 19 helps to funnel solids held in the sewage tank 10 to the sump pump pit 23 where they can be pumped out of the tank 10 by the pump 51 for proper disposal.

It should be understood that any number of the preferred tank floors 11 can be constructed side-by-side (not shown) to form an enlarged sewage tank area. In this case, wall panels 25 would only be constructed around the outer periphery of the sewage tank 10 proper. Also, the individual sewage tank floors 11 will be sealed to each other by a gasket (not shown) mounted in a groove (not shown) along the common border of the side-by-side tank floors 10 in a similar manner as the second gasket 41 is mounted between the first section 13 and the fourth section 19.

Numerous variations will occur to those skilled in the art. It is intended, therefore, that the foregoing descriptions be only illustrative of the present invention and that the present invention be limited only by the hereinafter appended claims.

I claim:

1. A sewage collection and separation tank for density separation of sewage which prevents leakage of the sewage from the tank which comprises:

(a) a preformed concrete sump box means adapted to be recessed in a floor of an earthen pit with a bottom wall and at least one sidewall extending from the bottom wall around a vertical axis, the sump box means having a first gasket means mounted in an outer surface of the sidewall and spaced above the bottom wall of the sump box means;

(b) a poured concrete tank floor on the floor of the earthen pit around the outer surface of the sump box means which envelopes the first gasket means of the sump box means, wherein the tank floor has been poured in consecutive sections radially around the vertical axis and the outer surface of the sidewall of the sump box means, each section of the tank floor having a lower face adjacent to the floor of the pit and a spaced apart upper face and spaced apart first and second sides between the faces and spaced apart edges between the sides;

(c) a second gasket means extending laterally from the first gasket means mounted in the sidewall of the sump box means, the second gasket means mounted along a first side of a first section of the tank floor so that when a last section of the tank floor is poured, a second side of the last section and the first side of the first section envelope the second gasket means to form a seal between the last section and the first section; and (d) a tank wall extending from the tank floor to define the tank.

2. The sewage collection and separation tank of claim 1 wherein the sump box means has a rectangular cross-section perpendicular to the vertical axis, and wherein the bottom wall of the sump box means is rectangular with four sidewalls extending from the bottom wall.

3. The sewage collection and separation tank of claim 2 wherein the tank floor is comprised of four sections and wherein the sides of adjacent sections abut along a plane that intersects one of the sidewalls of the sump box means.

4. The sewage collection and separation tank of claim 1 wherein the first gasket means has spaced apart ends and is mounted in a first groove in and around the outer surface of the sidewall of the sump box means so that the ends of the first gasket means abut each other to provide a seal.

5. The sewage collection and separation tank of claim 4 wherein the first gasket means is made of an elastomer which is mounted in the first groove of the sump box means and wherein the spaced apart ends of the first gasket means are solvent bonded or welded together when the first gasket means is mounted in and around the sump box means.

6. The sewage collection and separation tank of claim 3 wherein the second gasket means is mounted in a second groove in the first side of the first section of the tank floor and the second gasket means is enveloped by the second side of the last section of the tank floor.

7. The sewage collection and separation tank of claim 6 wherein the second gasket means is made of an elastomer.

8. The sewage collection and separation tank of claim 1 wherein a pump means is mounted in the sump box means and provides for removal of accumulated solids in the sump box means.

9. The sewage collection and separation tank of claim 1 wherein the upper face of the sections of the tank floor incline downwardly and inwardly from an outer edge of the earthen pit to the sump box means at an angle of between 3° and 6.5° degrees from a horizontal plane.

10. The sewage collection and separation tank of claim 1 wherein the tank floor has a rectangular shape perpendicular to the vertical axis.

11. The sewage collection and separation tank of claim 1 wherein footings are provided in the earthen pit to support the sections of the concrete tank floor.

12. The sewage collection and separation tank of claim 7 wherein the tank wall is comprised of a plurality of preformed concrete wall panels extending around the tank floor and having spaced apart front and back sides with spaced apart top and bottom ends between the sides and spaced apart first and second edges between the ends, wherein the sections of the tank floor are provided with a third groove formed around the tank floor, the third groove mounting a third gasket means abutting against the second gasket means mounted between the first section and the last section of the tank floor, the third gasket means mating with a groove provided in the bottom end of the wall panels to provide a seal between the wall panels and the tank floor and wherein adjacent wall panels are provided with a locking joint means to lock and seal the adjacent wall panels together.

13. The sewage collection and separation tank of claim 12 wherein the locking joint means for the adjacent wall panels is a tongue and a groove provided in adjacent first and second edges of the adjacent wall panels with a fourth gasket means provided between the locking joint means to seal the adjacent wall panels.

14. The sewage collection and separation tank of claim 13 wherein there are a plurality of poured concrete tank floors poured on the floor of the earthen pit around the outer surface of respective sump box means, wherein adjoining tank floors are poured side-by-side with a fifth gasket means mounted in a fourth groove formed in an outer edge of one of the sections of the first tank floor which abuts against an outer edge of one of the sections of the adjoining tank floor, wherein when the one of the sections of the adjoining tank floor is poured, the fifth gasket means mounted in the fourth groove in the outer edge of the one of the sections of the first tank floor is enveloped by the outer edge of the one of the sections of the first tank floor and the outer edge of the one of the sections of the adjoining tank floor to provide a liquid impervious seal between adjoining tank floors and wherein the tank wall extends from the plurality of tank floors to define the tank.

15. The sewage collection and separation tank of claim 14 wherein the first, second, third, fourth and fifth gasket means are mounted in multi-sided grooves.

16. The sewage collection and separation tank of claim 15 wherein the multi-sided grooves are semi-hexagonal.

17. The sewage collection and separation tank of claim 13 wherein an end of the fourth gasket means abuts against the third gasket means mounted around the tank floor for providing a liquid impervious seal between the wall panels and the tank floor.

18. The sewage collection and separation tank of claim 12 wherein the sections of the tank floor are provided with a channel which provides for the third groove formed around the tank floor and which provides for mounting the wall panels in the channel.

19. The sewage collection and separation tank of claim 1 wherein earth removed to form the earthen pit is used as backfill to support the tank wall extending from the tank floor.

20. The sewage collection and separation tank of claim 14 wherein the third the fourth and the fifth gasket means are made of an elastomer.

21. The sewage collection and separation tank of claim 13 wherein the third and the fourth gasket means are made of a bitumastic compound.

22. A method for constructing a sewage collection and separation tank for density separation of sewage which prevents leakage of sewage from the tank which comprises:

(a) providing a preformed concrete sump box means adapted to be recessed in a floor of an earthen pit and with a bottom wall and at least one sidewall extending from the bottom wall around a vertical axis, the sump box means having a first gasket means mounted in an outer surface of the sidewall and spaced above the bottom wall of the sump box means;

(b) mounting the sump box means in the earthen pit;

(c) pouring a concrete tank floor on the floor of the earthen pit around the outer surface of the sump box means which envelopes the first gasket means of the sump box means, wherein the tank floor is poured in consecutive sections radially around the vertical axis and the outer surface of the sidewall of the sump box means, each section having a lower face adjacent to the floor of the pit and a spaced apart upper face and spaced apart first and second sides between the faces and spaced apart edges between the sides and wherein a second gasket means that extends laterally from the first gasket means is mounted in the sidewall of the sump box means along a first side of a first section of the tank floor so that when a last section of the tank floor is poured, a second side of the last section and the first side of the first section envelope the second gasket means to form a seal between the last section and the first section; and (d) mounting preformed tank walls around the concrete floor to produce the tank.

23. The method of constructing the sewage collection and separation tank of claim 22 wherein the sump box means has a rectangular cross-section when viewed along the vertical axis, and wherein the bottom wall of the sump box means is rectangular with four sidewalls extending from the bottom wall.

24. The method of constructing the sewage collection and separation tank of claim 23 wherein the tank floor is poured with four sections and wherein the sides of adjacent sections abut along a plane that intersects one of the sidewalls of the sump box means.

25. The method of constructing the sewage collection and separation tank of claim 22 wherein the first gasket means has spaced apart ends and is mounted in a first groove in and around the outer surface of the sidewall of the sump box means so that the ends of the first gasket means abut each other.

26. The method of constructing the sewage collection and separation tank of claim 25 wherein the first gasket means is made of an elastomer which is mounted in the first groove of the sump box means and wherein the spaced apart ends of the first gasket means are overlapped when the first gasket means is mounted in and around the sump box means.

27. The method of constructing the sewage collection and separation tank of claim 24 wherein the second gasket means is mounted in a second groove in the first side of the first section of the tank floor and the second gasket means is enveloped by the second side of the last section of the tank floor.

28. The method of constructing the sewage collection and separation tank of claim 24 wherein the second gasket means is made of an elastomer.

29. The method of constructing the sewage collection and separation tank of claim 22 wherein a pump means is mounted in the sump box means and provides for removal of accumulated solids in the sump box means.

30. The method of constructing the sewage collection and separation tank of claim 22 wherein the sections of the tank floor are poured with an upper face which inclines downwardly and inwardly from an outer edge of the earthen pit to the sump box means at an angle of between 3° and 6.5° degrees from a horizontal plane.

31. The method of constructing the sewage collection and separation tank of claim 22 wherein the tank floor is poured to have a rectangular shape when viewed along the vertical axis.

32. The method of constructing the sewage collection and separation tank of claim 22 wherein footings are dug in the earthen pit to support the sections of the concrete tank floor.

33. The method of constructing the sewage collection and separation tank of claim 22 wherein the tank wall is provided by mounting a plurality of preformed concrete wall panels around the tank floor, the panels each having spaced apart front and back sides with spaced apart top and bottom ends between the sides and spaced apart first and second edges between the ends, wherein the sections of the tank floor are provided with a third groove formed around the tank floor, the third groove mounting a third gasket means abutting against the second gasket means mounted between the first section and the last section of the tank floor, the third gasket means mating with a groove provided in the bottom end of the wall panels to provide a seal between the wall panels and the tank floor and wherein adjacent wall panels are provided with a locking joint means to lock the adjacent wall panels together.

34. The method of constructing the sewage collection and separation tank of claim 33 wherein the locking joint means for the adjacent wall panels is a tongue and a groove which are mounted in adjacent first and second edges of the adjacent wall panels with a fourth gasket means provided between the locking joint means to seal the adjacent wall panels.

35. The method of constructing the sewage collection and separation tank of claim 34 wherein there are a plurality of poured concrete tank floors poured on the floor of the earthen pit around the outer surface of respective sump box means, wherein adjoining tank floors are poured side-by-side with a fifth gasket means mounted in a fourth groove formed in an outer edge of one of the sections of the first tank floor that abuts against an outer edge of one of the sections of the adjoining tank floor, wherein when the one of the sections of the adjoining tank floor is poured, the fifth gasket means mounted in the fourth groove in the outer edge of the one of the sections of the first tank floor is enveloped by the outer edge of the one of the sections of the first tank floor and the outer edge of the one of the sections of the adjoining tank floor to provide a liquid impervious seal between adjoining tank floors and wherein the tank wall extends from the plurality of tank floors to define the tank.

36. The method of constructing the sewage collection and separation tank of claim 35 wherein the first, second, third, fourth and fifth gasket means are mounted in multi-sided grooves.

37. The method of constructing the sewage collection and separation tank of claim 36 wherein the multi-sided grooves are semi-hexagonal.

38. The method of constructing the sewage collection and separation tank of claim 34 wherein an end of the fourth gasket means is abutted against the third gasket means mounted around the tank floor for providing a liquid impervious seal between the wall panels and the tank floor.

39. The method of constructing the sewage collection and separation tank of claim 33 wherein the sections of the tank floor are provided with a channel which provides for the third groove formed around the tank floor and which provides for mounting the wall panels in the channel.

40. The method of constructing the sewage collection and separation tank of claim 22 wherein earth removed to form the earthen pit is used as backfill to support the tank wall extending from the tank floor.

41. The method of constructing the sewage collection and separation tank of claim 35 wherein the third the fourth and the fifth gasket means are made of an elastomer.

42. The method of constructing the sewage collection and separation tank of claim 34 wherein the third and the fourth gasket means are made of a bitumastic compound.

* * * * *